C. A. WARD.
BRAKE OPERATING MECHANISM.
APPLICATION FILED MAR. 18, 1919.
1,395,540.
Patented Nov. 1, 1921.
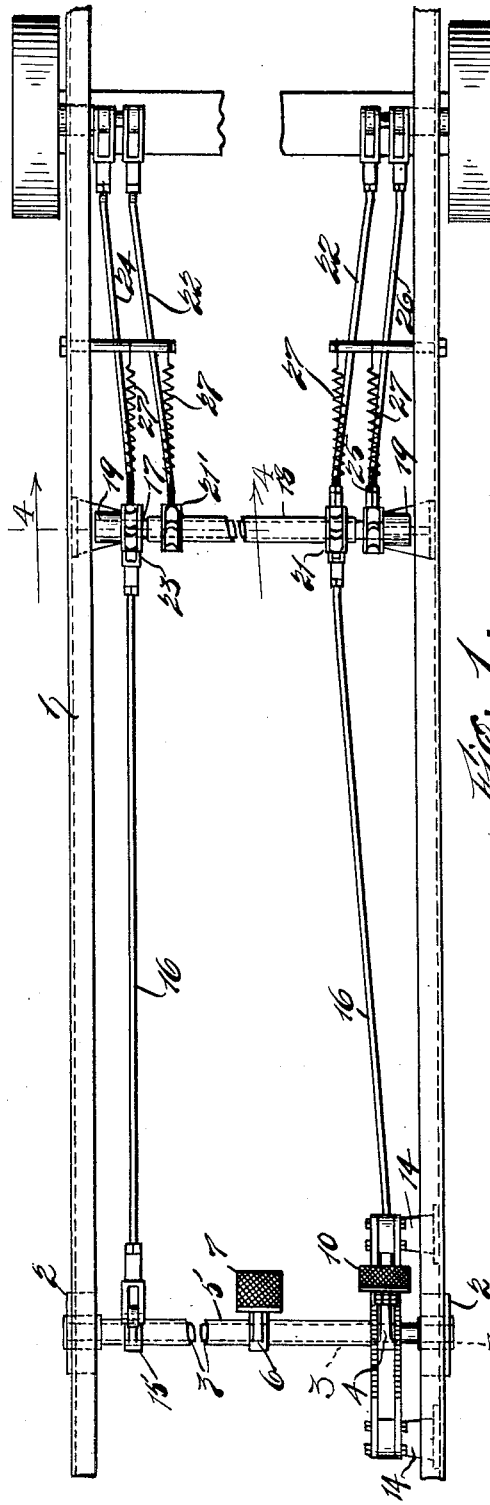
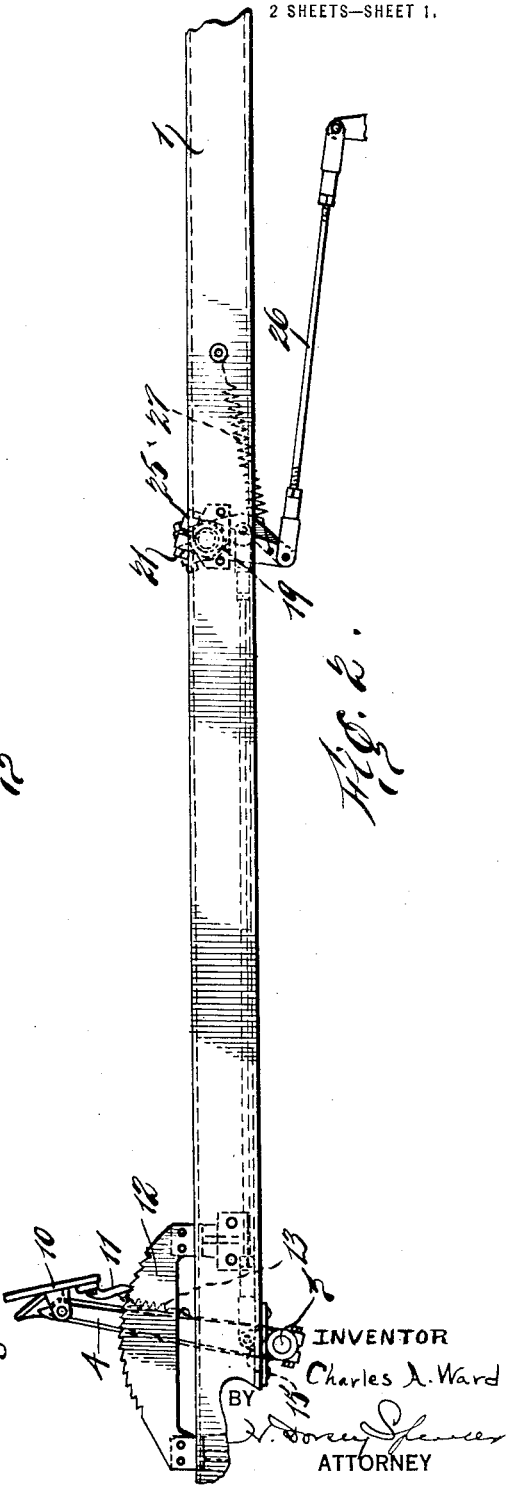
INVENTOR
Charles A. Ward
BY
ATTORNEY

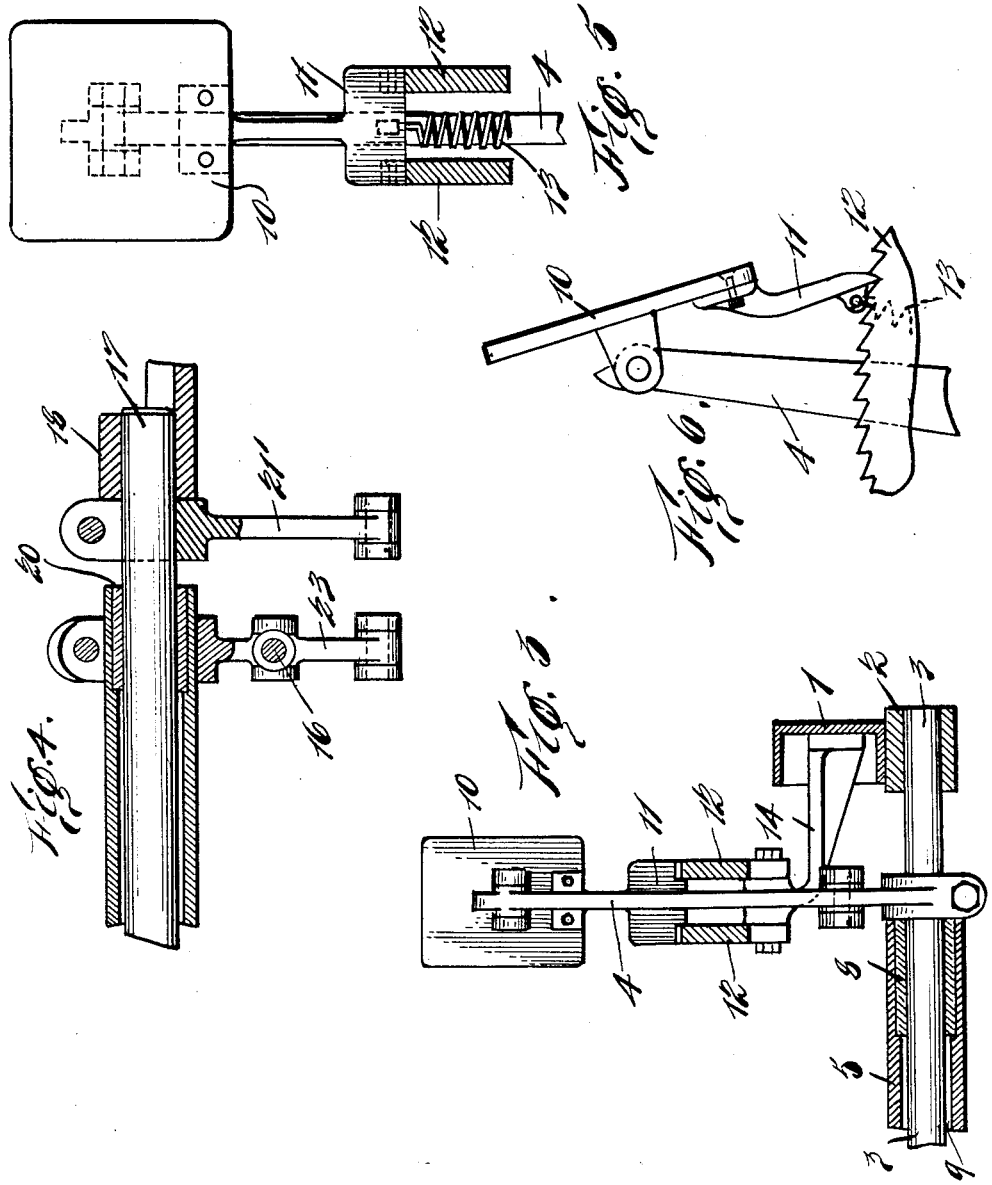

UNITED STATES PATENT OFFICE.

CHARLES A. WARD, OF MOUNT VERNON, NEW YORK.

BRAKE-OPERATING MECHANISM.

1,395,540.  Specification of Letters Patent.  Patented Nov. 1, 1921.

Application filed March 18, 1919. Serial No. 283,310.

*To all whom it may concern:*

Be it known that I, CHARLES A. WARD, a citizen of the United States, residing at Mount Vernon, county of Westchester, State of New York, have invented certain new and useful Improvements in Brake-Operating Mechanism, of which the following is a clear, full, and exact description.

My invention relates to brake-operating mechanism, particularly for use on motor vehicles and has for a general object a compact arrangement of operating mechanism for a plurality of independently operable brakes including concentrically mounted independently operable shafts, and which mechanism is so constructed that it will be weatherproof and will not be affected in its ease or certainty of operation by marked temperature changes, especially in zero weather when other mechanisms of this general type will freeze.

With these and other ends in view, an important feature of my invention consists in the provision of a small space or clearance between the shaft and the surrounding sleeve forming part of the connections between the brake operating levers and the brakes themselves, this spacing not only serving effectually to prevent setting or freezing of the parts due to marked changes in temperature, but also facilitating the lubrication of the parts and, in fact, furnishing an excess volume of such lubrication and thus preventing so-called "freezing" in the mechanical sense.

Other objects and important features of the invention will be apparent from the following description and claims when taken in connection with the accompanying drawings, in which—

Figure 1 is a top plan view;

Fig. 2, a side elevation;

Fig. 3, a part sectional, part elevational view, the sectional view being taken at approximately the line 3—3, Fig. 1;

Fig. 4, a part sectional, part elevational view, the sectional view being taken at approximately the line 4—4, Fig. 1;

Fig. 5, a front elevational view of the emergency brake pedal, showing the ratchet members in section, and Fig. 6, a side elevational view of the emergency brake pedal.

Referring to the drawing, 1 indicates the side framing of the truck or other vehicle to which my invention may be applied. Each of the side frames at the forward ends thereof carries a bearing 2 for the support of a shaft 3. Rigidly secured to the shaft 3 in any suitable manner, is a lever 4, controlling the emergency brake through connections which will be hereinafter described. A sleeve or hollow shaft 5 is supported on the shaft 3 and to said hollow shaft is rigidly secured the service brake lever 6, at the end of which is mounted the foot pedal 7. Connections, which will be hereinafter described, lead from the hollow shaft 5 to the service brake.

As heretofore stated, an important feature of my invention relates to the mounting of the sleeve or hollow shaft 5 on the shaft 3 in such a manner that there is no danger of the two shafts freezing together in cold weather, or what is commonly known as "freezing" from lack of lubrication. In the preferred form of my invention, I accomplish this by providing at each end of the hollow shaft a bushing 8 made of brass, bronze or other suitable material. While this bushing is slightly countersunk within the outer shaft or sleeve 5, as shown in Fig. 3, nevertheless it is of sufficient thickness, and the outer shaft 5 is of such inside diameter, that there is a small space 9 between the shafts. This space serves as an oil well for lubricating the bushings and also prevents freezing or sticking of the parts due either to marked changes in temperature or to the lack of lubrication. It is also probable that the difference in expansibility between the metal of which the bushing is composed and the metal composing the shafts also contribute to this result.

The emergency brake lever 4 is provided with a pedal 10, which is situated at such a distance from the service foot pedal 7, that the same foot of the operator that is used for this service pedal may conveniently be used to apply the emergency brake when required. In order that this emergency brake may be conveniently applied, and as conveniently released, I pivot the foot pedal 10 on the lever 4, so that said pedal has a rocking motion on said lever. Also preferably connected to said pedal 10 is a pawl 11 held in contact with ratchet members 12 by means of a spring 13. In order to apply the emergency brake, pressure is directed by the foot against the pedal 10 to move the lever 4, and consequently the shaft 3 connected thereto, to set the brake. During this operation the pawl 11 rides over the ratchet members 12 and when the foot is released, the brake remains set, it being so held set by the pawl 11, as will be readily understood. When it is desired to release the emergency brake, the pedal 10 is rocked slightly on its pivot, at the same time a slight pressure being given to the brake-lever 4 to permit easy release of the pawl.

The ratchet members 12 are supported by brackets 14 secured to one of the side frame members 1, as clearly indicated in Figs. 1 and 3, and are removable and renewable for wear.

15 indicates lever arms rigidly secured respectively to the shaft 3 and sleeve 5, and connected to each lever arm is a link 16, said links being connected at their other ends to lever arms rigidly connected to an intermediate shaft 17 and to a sleeve 18 respectively. The shaft 17 is carried by brackets 19 secured to the side beams 1, and between the shaft 17 and sleeve 18 are bushings 20 which are similar in construction to the bushings 8, already described and serve a similar function. The emergency brake link 16 is connected to the sleeve 18 by a double lever arm 21 to which lever arm is also attached a link 22. On the other side of the frame, and also connected to the sleeve 18, is a single lever arm 21' to which is attached a link 22. The links 22 each operate a brake. Similar connections are made from the service brake by means of the link 16 connected to a double lever arm 23 rigid on the shaft 17, and also connected to the double lever arm 23 is a link 24. A single lever arm 25 on the opposite side of the vehicle is also connected to the shaft 17, which lever arm is connected by link 26 with its brake. Springs 27 serve to return the lever arms and links in the usual manner.

In Fig. 2 of the drawings, the emergency brake is shown as locked in brake setting position, and the operation of the brake mechanism is therefore as follows: The operator of the vehicle will place one foot upon the pedal 10 of the emergency brake lever and the other foot upon the pedal 7 of the service brake and when ready to start, he will rock the pedal 10 of the emergency brake sufficiently to release its locking pawl 11 from the ratchet 12, thus permitting the emergency brake to release itself under the action of the springs 27 connected with this brake. After releasing the emergency brake, the vehicle then being under the control of the service brake, the operator may remove his foot entirely from the treadle 10 if he so desires.

It will be seen that the emergency brake lever operates the emergency brake through the concentric sleeve 18, which in turn is connected by the link 16 to the rock shaft 13, whereas the service brake, operated from the pedal 7, is connected to the rock shaft 17 at the rear, this shaft being in turn connected to the sleeve 5 at the front by means of the link 16 and the rock arm 15.

Having thus described my invention, what I desire to claim and secure by Letters Patent is:

1. In a brake mechanism, the combination with two brakes, means for operating said brakes, comprising concentric shafts, one of which is mounted in bearings and the other of which is supported by the first, and connections between the respective shafts and the brakes, of bushings having a different coefficient of expansion from that of said shafts, concentrically spacing said shafts and constituting the only bearing support of that one of said shafts which is carried by the other.

2. In a brake mechanism, the combination with two brakes and means for operating the said brakes, comprising concentric shafts and connections between the respective shafts and the brakes, of bushings having a different coefficient of expansion from that of said shafts, concentrically spacing said shafts at the ends of their overlap and forming with said shafts a lubricant holding chamber.

3. In a brake mechanism, the combination with two brakes and means for operating the said brakes, comprising concentric shafts and connections between the respective shafts and the brakes, of bushings having a different coefficient of expansion from that of said shafts, concentrically spacing said shafts at the ends of their overlap and forming with said shafts a lubricant holding chamber, and a brake operating lever connected to each shaft.

4. In a brake mechanism, the combination with two brakes, of a shaft, a foot lever connected to said shaft, an intermediate shaft, connections from said intermediate shaft to one of said brakes, and connections from said intermediate shaft to said first shaft, a sleeve on said first shaft, a sleeve on said intermediate shaft, connections from said last mentioned sleeve to said other brake, and connections from said last mentioned sleeve to said first mentioned sleeve, a foot lever connected to said first mentioned sleeve, means having a different coefficient of expansion for concentrically spacing apart the first mentioned shaft from its sleeve, and similar means for spacing apart the intermediate shaft from its sleeve, said means forming with said shafts and sleeves lubricant holding chambers.

Signed at Mount Vernon, N. Y., this 15 day of March, 1919.

CHARLES A. WARD.